Figure 1:
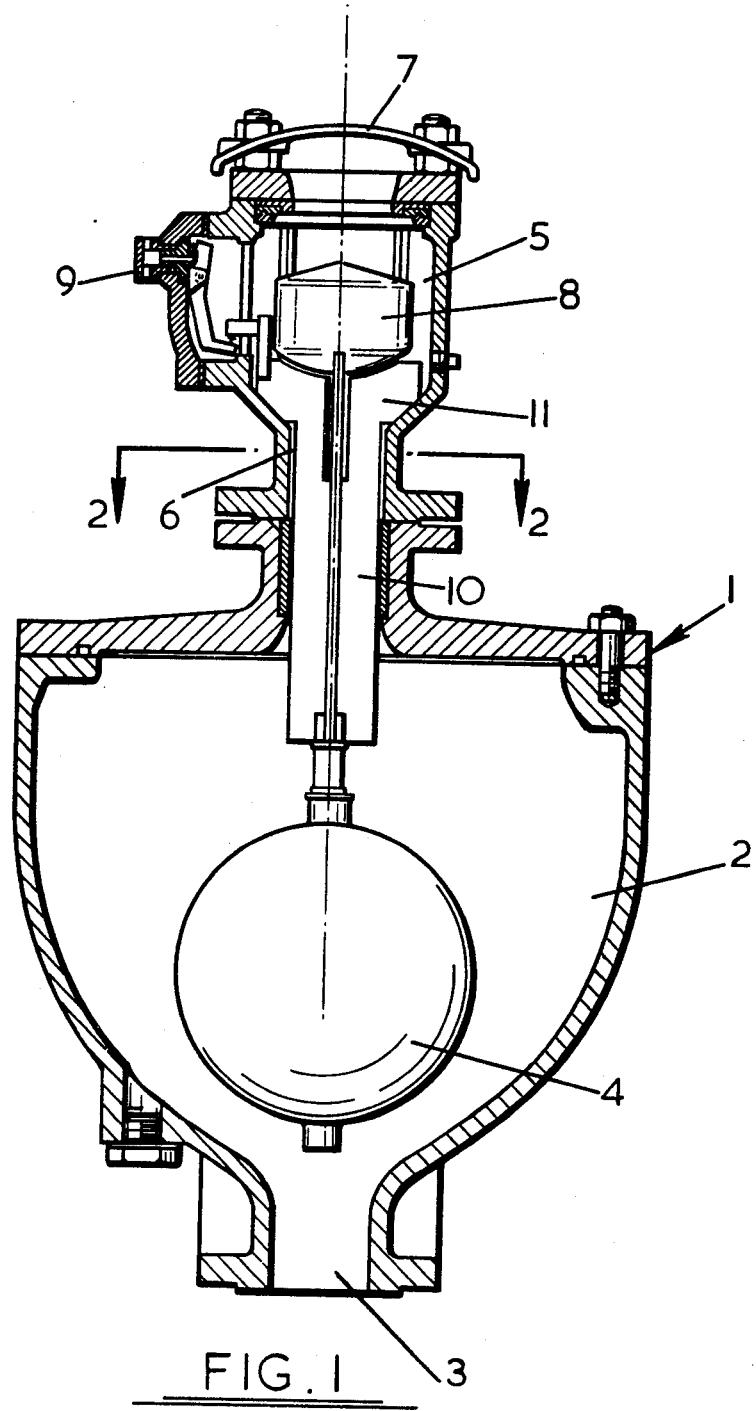

United States Patent [19]

Lambie

[11] 4,243,066
[45] Jan. 6, 1981

[54] FLUID FLOW CONTROL VALVES

[75] Inventor: John W. Lambie, Kilmarnock, Scotland

[73] Assignee: Neptune Glenfield Limited, Ayrshire, Scotland

[21] Appl. No.: 972,456

[22] Filed: Dec. 22, 1978

[30] Foreign Application Priority Data

Dec. 30, 1977 [GB] United Kingdom ............... 54263/77

[51] Int. Cl.³ ............................................ F16K 31/18
[52] U.S. Cl. ..................................... 137/202; 137/430
[58] Field of Search ........................ 137/202, 429, 430

[56] References Cited

U.S. PATENT DOCUMENTS

| | | | |
|---|---|---|---|
| 1,116,931 | 11/1914 | Schutt | 137/202 |
| 1,825,776 | 10/1931 | Brubaker | 137/202 |
| 2,111,473 | 3/1938 | Hudson | 137/202 |
| 3,834,415 | 9/1974 | Herron | 137/202 |

*Primary Examiner*—Alan Cohan
*Attorney, Agent, or Firm*—Larson, Taylor and Hinds

[57] ABSTRACT

A valve incorporates a float chamber containing a float, and an air chamber above the float chamber containing a valve element movable vertically between a port in the bottom of the air chamber communicating with the top of the float chamber and an air vent in the top of the air chamber the float and the valve element being connected by a push rod passing through the port. The push rod has a cross section presenting several lobes. A plain tubular guide forms at least part of a passage between the float chamber and the air chamber terminating at the top end in the port. The push rod passes through the tubular guide, the lobes being a sliding fit therein. The valve element may rest in a cup-shaped cage within the air chamber. The upper end of the push rod may be slotted to permit it to straddle the bars of the cage and enter the cage so as to engage the valve element.

5 Claims, 4 Drawing Figures

FLUID FLOW CONTROL VALVES

This invention relates to fluid flow control valves and particularly to fluid flow control valves of the type intended for fitting to sewage pipelines, such a valve being used to ventilate the pipeline when the pipe is being emptied and to release automatically gases which have accumulated during normal use of the pipeline and during surge conditions.

A valve of the type described incorporates a casing including a float chamber connectible to a pipeline with which the valve is to operate and containing a float, an air chamber in communication with the float chamber by way of a port in the bottom of the air chamber, the air chamber being formed with an air vent at the top and containing a valve element movable between the port in the bottom of the chamber and the air vent in the top, a push rod extending between the float in the float chamber and the air chamber and extending between the float and the valve element in the air chamber whereby to communicate vertical movement of the float to said valve element, and a relief valve operable to vent the casing, said relief valve having an operative member engaged by the push rod and being attached to the casing at a point between the float chamber and the air chamber.

In a valve of the type described the push rod must be properly guided while providing free communication past the push rod between the float chamber and the air chamber. Also as there is a considerable distance between the float in the float chamber and the valve element in the air chamber the push rod is of considerable length. Its diameter has to be kept to a minimum to avoid constricting the area of the port in the bottom of the air chamber through which it passes. It is thus slender and requires to be supported in a guide. Such guide must be of the form of a spider and this also reduces the effective area of the port.

An air release valve according to the present invention incorporates a float chamber connectible to a pipeline and containing a float, an air chamber in communication with the float chamber by way of a passage leading from the top of the float chamber to the bottom of the air chamber, the top of the air chamber being formed with an air vent, a valve element in the air chamber movable from a lowermost position above and clear of the entry of the passage into the air chamber and an upper position closing the air vent, and a push rod located between the float and the valve element and operative to communicate movement of the float to the valve element, said push rod being formed with a cross section of multi-lobe shape and being slidable through a plain tubular guide forming at least a part of the passage between the float chamber and the air chamber.

The valve element may be disposed within a cup-shaped cage located within the air chamber and the upper end of the push rod may be slotted to permit the push rod to straddle the bars of the cage and enter the cage to enable it to come into contact with the valve element within the cage.

The preferred form of push rod is one which in cross section has four lobes, i.e. is of cruciform cross section. With certain forms of cage supporting the valve element in the air chamber it may, however, be more convenient to provide a push rod having three lobes.

The control valve may incorporate a relief valve arranged to vent the casing, the entry port of said relief valve being located in the air chamber, said relief valve having an operating member coupled to the push rod so that the relief valve is opened and closed by movement of the push rod as the float moves downwards and upwards respectively in the float chamber.

The float chamber may be closed by a cover which supports the air chamber and the guide for the push rod. For attachment of the cover to the float chamber the float chamber may be formed with an inwardly projecting flange to which the cover is attached. The use of an inwardly projecting flange rather than the usual outwardly projecting flange makes possible the provision of a float chamber of maximum capacity for any particular overall outside diameter. A float chamber of as large capacity as possible within the given overall outside diameter is desirable as it makes it possible to maximize the working pressure of the valve.

Figure 2:
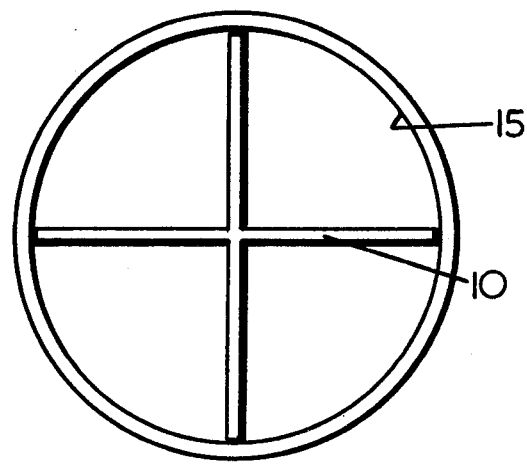
Figure 4:
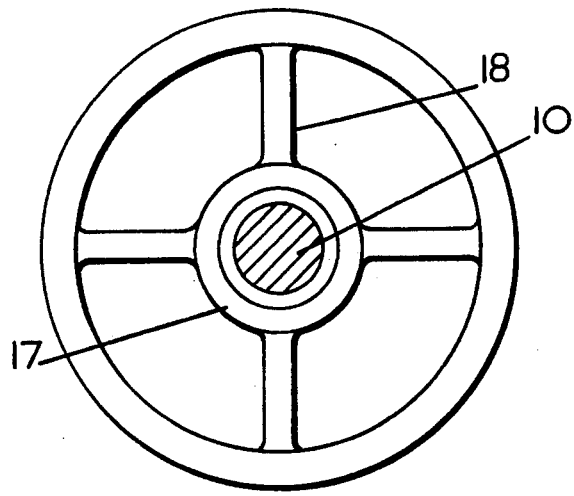
Figure 3:
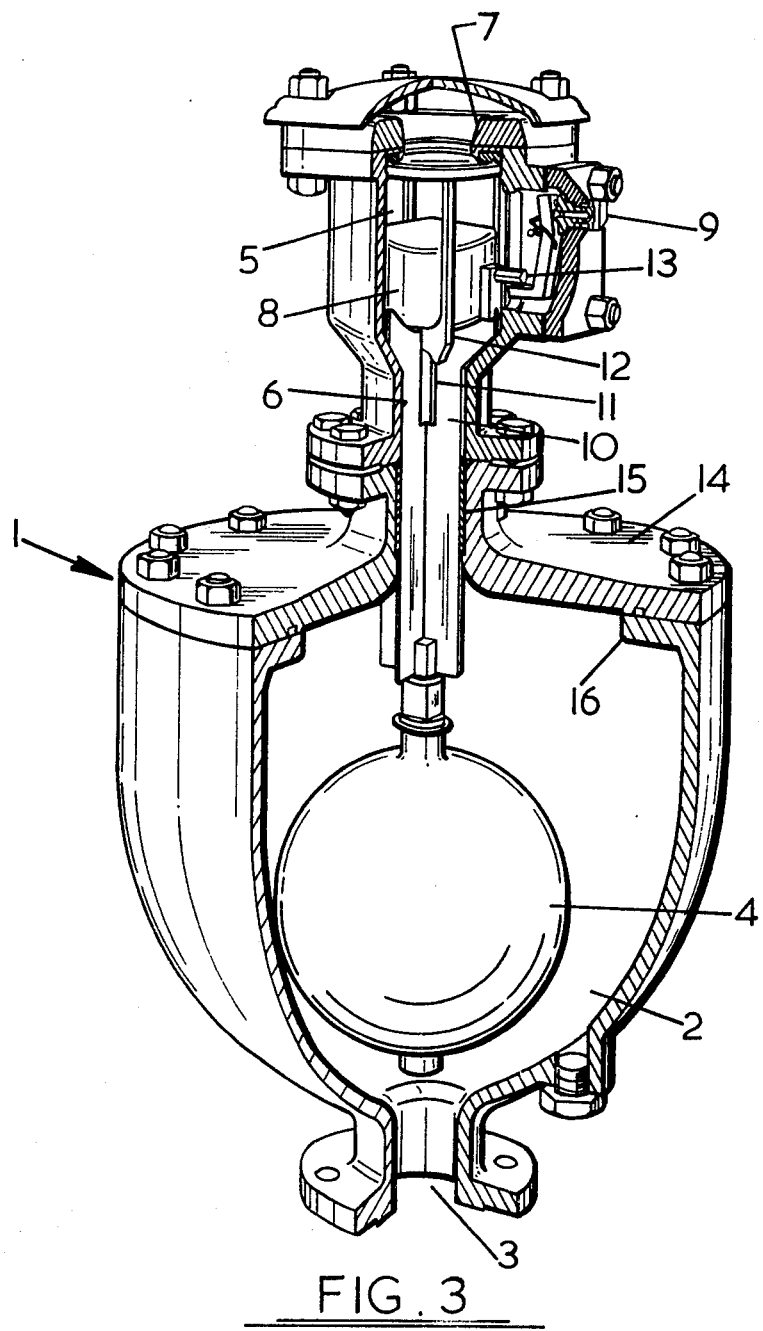

A practical embodiment of the invention is illustrated in the accompanying drawings in which FIG. 1 is a vertical section through the centre line of a valve, FIG. 2 is a section through the line 2—2 in FIG. 1, FIG. 3 is a perspective cut away view of the valve and FIG. 4 is a cross section through a known valve as exemplified by that which is the subject of the prior U.S. Pat. No. 1,049,907, the section being through the same portion of the known valve as that through which the section on the line 2—2 of FIG. 1 is taken.

In the drawings and referring first to FIGS. 1, 2 and 3, 1 denotes a casing including a float chamber 2 formed with an opening 3 in the bottom for connection to a pipeline. The float chamber 2 contains a float 4. 5 denotes an air chamber in communication with the float chamber 2 by way of a passage 6. 7 denotes an air vent in the top of the air chamber 5 and 8 denotes a valve element arranged to move vertically to close and open the vent 7. 9 denotes a relief valve for venting the casing 1, the entry port of the relief valve being in the air chamber 5. 10 denotes a push rod located between the float 4 and the valve element 8, said push rod being of the multi-lobe shape which in the illustrated embodiment has four lobes i.e. it is of cruciform section. The upper end of the push rod 10 is arranged to come against the valve element 8 and is formed with a slot 11 to permit the push rod 10 to straddle the bars 12 of a cage of cup shape located within the air chamber and containing the valve element 8. The bars 12 of the cage serve to guide the valve element 8 towards the air vent 7, the slot 11 permitting the push rod 10 to enter the cage and raise the valve element 8 within the cage. 13 denotes an operating member for the relief valve 9 coupled to the push rod 10 to be movable therewith, the arrangement of the air vent being such that when the float 4 moves downwards and upwards in the float chamber taking with it the push rod 10 the relief valve 9 is opened and closed respectively. The float chamber 2 is closed by a cover 14 which supports the air chamber 5 and a plain tubular guide 15 forming part of the passage 6 and acting as a guide for the push rod 10. The cover 14 is fastened to an inwardly projecting flange 16 presented by the float chamber 2. The use of an inwardly projecting flange rather than an outwardly projecting flange minimizes the overall outside diameter of the float chamber for any given capacity.

Reference is now made to FIGS. 2 and 4 of the drawings. FIG. 2 shows how the construction of the present invention provides a negligible reduction of area in the passage 6 whereas FIG. 4 shows the large reduction of area occurring in previous valves of the same type. In the prior construction as exemplified by FIG. 4 the push rod 10 is supported by a guide 17 formed as a spider with supporting legs 18. The large reduction in area consequent on this construction is evident. There are also advantages lying in the greater stiffness and thus resistance to bending of the lobed push rod.

Other advantages of the valve of the invention are that the relief valve being located at the level of the air chamber is at the maximum height above the normal operating water level thus almost eliminating the possibility of water entering the relief valve and that the float chamber with its inwardly projecting flange makes it possible to provide the maximum volume of float chamber within given outside dimensions. The maximum volume is desirable so that higher working pressures can be used and consequently the increased volume float chamber enables the valve of the invention to use a higher working pressure than the conventional type of valve of the same overall dimensions having a outwardly projecting flange.

What is claimed is:

1. An air release valve incorporating a float chamber connectable to a pipeline and containing a float, an air chamber in communication with the float chamber by way of a passage leading from the top of the float chamber to the bottom of the air chamber, the top of the air chamber being formed with an air vent, a cup-shaped cage formed of bars located within the air chamber, a valve element contained within said cup-shaped cage in the air chamber and movable from a lowermost position above and clear of the entry of the passage into the air chamber and an upper position closing the air vent and a push rod having a cross section of multi-lobe shape located between the float and the valve element and operative to communicate movement of the float to the valve element, the upper end of the push rod being slotted to permit the push rod to straddle the bars of the cage and enter the cage to enable it to come into contact with the valve element within the cage.

2. An air release valve as claimed in claim 1 in which the push rod has four lobes i.e. it is of cruciform cross section.

3. An air release valve as claimed in claim 1 including a relief valve arranged to vent the casing, the entry port of said relief valve being located in the air chamber, said relief valve having an operating member coupled to the push rod so that the relief valve is opened and closed by movement of the push rod as the float moves downwards and upwards respectively in the float chamber.

4. An air release valve as claimed in claim 1 in which the float chamber is closed by a cover which supports the air chamber and the guide for the push rod.

5. An air release valve as claimed in claim 4 in which the float chamber is formed at its upper end with an inwardly projecting flange to which the cover is attached.

* * * * *